United States Patent Office 3,284,468
Patented Nov. 8, 1966

3,284,468
SUBSTITUTED XYLENEDIOLS
Fred Keller, Northridge, Calif., assignor to Rexall Drug and Chemical Company, Los Angeles, Calif., a corporation of Delaware
No Drawing. Filed May 24, 1965, Ser. No. 458,367
17 Claims. (Cl. 260—332.3)

This application is a continuation-in-part of my application entitled "Substituted Triphenylmethanols," Serial Number 366,169 filed May 8, 1964, now abandoned.

This invention relates to compositions of matter classified in the art of chemistry as substituted xylenediols.

The invention sought to be patented is described as residing in the concept of a chemical compound having a molecular structure in which the o-xylene-$\alpha,\alpha'$-diol nucleus bears on the $\alpha$-carbon atom a di-lower alkylamino-lower alkyl radical, and the hereinafter disclosed equivalents thereof.

As used throughout this application, the term "lower alkyl" embraces both straight and branched chain alkyl radicals containing 1 to 6 carbons, for example methyl, ethyl, propyl, isopropyl, n-butyl, tert-butyl, n-amyl, n-hexyl, 2-ethylbutyl, 2,3-dimethylbutyl and the like; the term "lower alkoxy" embraces both straight and branched chain alkoxy radicals containing 1 to 6 carbon atoms, for example methoxy, ethoxy, propoxy, isopropoxy, n-butoxy, tert-butoxy, n-amyloxy, n-hexyloxy, 2-ethylbutoxy, 2,3-dimethylbutoxy and the like; and the term "halo" embraces chloro, bromo, fluoro and iodo.

The tangible embodiments of this invention possess the inherent general physical characteristics of being solid crystalline materials in the form of their free bases when the $\alpha'$-carbon atom of the nucleus is di-substituted as described hereinafter and in the form of their acid addition salts when the $\alpha'$-carbon atom of the nucleus is unsubstituted. Nuclear magnetic resonance (NMR) data and elemental analyses, taken together with the aforementioned physical properties, the nature of the starting materials and the mode of synthesis, positively confirm the structure of the compounds sought to be patented.

The tangible embodiments of this invention possess the inherent applied use characteristics of having significant pharmacological activity without adverse toxicity as anti-cholinergic, antipyretic, anti-inflammatory and central nervous system stimulant agents as determined by recognized and accepted pharmacological test procedures, as well as being useful and valuable chemical intermediates in the production of other chemical compounds that possess significant pharmacological activity. Treatment of the tangible embodiments of this invention with a strong mineral acid dehydrating agent in the presence of an inert solvent yields compounds in which the phthalan nucleus bears at the 1-position a di-lower alkylamino-lower alkyl group. Such phthalans are described and claimed in my application entitled "Substituted Phthalans," Serial Number 458,475, filed concurrently herewith, which is a continuation-in-part of my application entitled "Substituted 1,1-Diphenylphthalans," Serial Number 405,613, filed October 21, 1964.

The manner and process of making and using the invention will now be generally described so as to enable a person skilled in the art of chemistry to make and use the same as follows:

The reaction sequence, leading to the substituted o-xylene-$\alpha,\alpha'$-diols of this invention is set forth as follows:

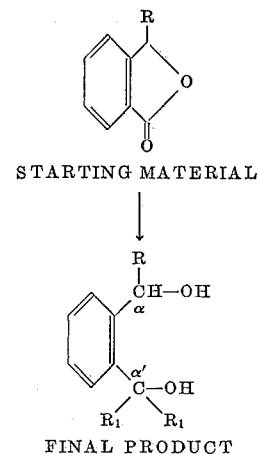

STARTING MATERIAL

FINAL PRODUCT wherein R is di-lower alkylamino-lower alkyl and its hereinafter described equivalents and $R_1$ is hydrogen or its hereinafter described equivalents.

The starting materials depicted in the above reaction sequence are known compounds which may be conveniently prepared as described by Dey et al. [(Arch. Pharm. 275:397 (1937))].

In the preparation of the tangible embodiments of this invention where $R_1$ is hydrogen, the starting material is treated with an alkali metal aluminohydride reducing agent, for example lithium aluminium hydride, at room temperature in the presence of an inert organic solvent such as tetrahydrofuran. It has been found that treatment of the starting material with a reagent of the formula $R_1$—Mg—Br or $R_1$—Li, where $R_1$ is an organic radical of the alkyl, aryl, aralkyl or heterocyclic series such as lower alkyl, phenyl, phenyl-lower alkyl, thienyl and phenyl and phenyl-lower alkyl substituted with one or more lower alkyl, lower alkoxy, halo or trifluoromethyl radicals results in the preparation of final products having two such $R_1$ substituents on the $\alpha'$-carbon atom of the nucleus which have the same utility as the final products in which $R_1$ is hydrogen and are their full equivalents. Such reaction of the starting materials with the $R_1$—Mg—Br or $R_1$—Li reagent is carried out by treatment at room temperature up to the reflux temperature of the solvent—for example diethyl ether, tetrahydrofuran, n-hexane and the like—with recovery of the product by conventional techniques of crystallization.

Starting materials in which the di-lower alkylamino portion of the di-lower alkylamino-lower alkyl radical (R) is replaced by an amino or mono-lower alkylamino radical or by a heterocyclic ring linked to the lower alkyl group attached to the $\alpha$-carbon atom of the nucleus through a nitrogen atom, such as piperidino, pyrrolidino, morpholino, piperazino and the like and/or starting materials having one or more lower alkyl, lower alkoxy, trifluoromethyl or halo radicals on the benzene ring are prepared as described in the aforementioned Dey et al. article and such starting materials are the full equivalents in the above-described reactions to yield correspondingly substituted o-xylene-$\alpha,\alpha'$-diols which have the same utility as the specific o-xylene-$\alpha,\alpha'$-diols described above.

The tangible embodiments of this invention can, if desired, be converted into nontoxic, pharmaceutically acceptable acid addition and quaternary ammonium salts. In the case of final products having no substitution on the $\alpha'$-carbon atom of the nucleus ($R_1$ is hydrogen), the acid addition salts which may be formed include salts with inorganic acids such as the hydrochloride, hydrobromide, hydroiodide, sulfate, phosphate, and the like, as well as salts with organic acids including mono- and polybasic acids such as the acetate, propionate, citrate, tartrate, malate, maleate and fumarate. In the case of final products having disubstitution on the $\alpha'$-carbon atom of the nucleus as described above ($R_1$ is other than hydrogen), treatment with mineral acids results in the conversion of the final products into the corresponding substituted phthalans which are described and claimed in my application entitled "Substituted Phthalans" filed concurrently herewith and referred to above. Thus, acid addition salts cannot be formed of such substituted final products with inorganic acids. Cautious treatment, however, of such substituted final products with organic acids of the class described above does result in the preparation of acid addition salts corresponding to the organic acid used. Among the useful quaternary salts are those formed with such alkyl halides as methyl iodide, n-hexyl bromide and the like. For satisfying the criterion of pharmaceutical acceptability, salt will not be substantially more toxic than the free base itself and must be able to be incorporated into conventional liquid or solid pharmaceutical media.

The tangible embodiments of this invention, either as free bases or in the form of a non-toxic pharmaceutically acceptable salt as above described, can be combined with conventional pharmaceutical diluents and carriers to form such dosage forms as tablets, suspensions, solutions, suppositories and the like.

The best mode contemplated by the inventor for carrying out the invention will now be set forth as follows:

EXAMPLE 1

$\alpha$-Dimethylaminomethyl-o-xylene-$\alpha,\alpha'$-diol

To a well-stirred slurry of lithium aluminum hydride (9.5 g., 0.25 mole) in tetrahydrofuran (200 ml.) is added dimethylaminophthalidylmethane (50 g., 0.25 mole) in tetrahydrofuran (150 ml.). The reaction mixture is stirred for 16 hours at room temperature and then worked up to give 42 g. (72%) of the hydrochloride salt which is recrystallized from acetonitrile to yield 33 g. of the pure hydrochloride salt, M.P. 134°–135° C.

Analysis.—Calculated for $C_{11}H_{18}NO_2Cl$: C, 57.01%; H, 7.82%; N, 6.04%; Cl, 15.29%. Found: C, 57.57%; H, 7.80%; N, 6.43%; Cl, 15.19%.

The following examples illustrate the preparation of other tangible embodiments of this invention:

EXAMPLE 2

$\alpha$-(1-dimethylaminopropyl)-o-xylene-$\alpha,\alpha'$-diol

Using the same procedure described in Example 1, 1-dimethylamino-1-phthalidylpropane (20.0 g., 0.1 mole) is reduced with lithium aluminum hydride to yield 21 g. (89%) of the hydrochloride salt, M.P. 159°–162° C., crystallized from isopropyl alcohol.

Analysis.—Calculated for $C_{13}H_{22}NO_2Cl$: C, 60.10%; H, 8.53%; N, 5.39%; Cl, 13.64%. Found: C, 59.95%; H, 8.59%; N, 5.52%; Cl, 13.44%.

EXAMPLE 3

$\alpha$-Dimethylaminomethyl-$\alpha',\alpha'$-di-n-butyl-o-xylene-$\alpha,\alpha'$-diol To a solution of dimethylaminophthalidylmethane (19.0 g., 0.1 mole) in ether (200 ml.) is added slowly at between 0° and 10° C. a solution of n-butyl-lithium in hexane (185 ml., 3 molar ratio). The mixture is stirred for an additional 30 minutes at room temperature and ammonium chloride solution (50 ml.) is added to liberate the free base. The ethereal layer is washed with water, dried and evaporated to an oil which is converted to the hydrochloride salt (24 g.) that upon recrystallization from acetonitrile yields 11.5 g. of product, M.P. 204°–206.5° C.

Analysis.—Calculated for $C_{19}H_{34}NO_2Cl$: C, 66.35%; H, 9.96%; N, 4.07%; Cl, 10.31%. Found: C, 66.28%; H, 9.97%; N, 4.14%; Cl, 10.01%.

EXAMPLE 4

$\alpha$-Dimethylaminomethyl-$\alpha',\alpha'$-diphenyl-o-xylene-$\alpha,\alpha'$-diol Dimethylaminophthalidylmethane (19.5 g., 0.1 mole) and phenylmagnesium bromide (69 ml., 0.2 mole) in ether (300 ml.) are refluxed with stirring overnight. The mixture is cooled to room temperature and then broken up with the addition of a solution of ammonium chloride (90 g.) in water (2000 ml.). The resulting solution is extracted four times with ether. The combined ether extracts are washed and dried over anhydrous magnesium sulfate and then evaporated to yield a white fluffy resin (about 31 g.). The resin is taken up in ether, a small amount of petroleum ether added and crystallization is induced by scratching the vessel wall. The product is recrystallized to yield flat needles or platelets (22.0 g., 30%), M.P. 131.5°–132.5° C.

Analysis. — Calculated for $C_{23}H_{25}NO_2 \cdot H_2O$: C, 75.59%; H, 7.45%; N, 3.83%. Found: C, 75.85%; H, 7.44%; N, 4.06%.

EXAMPLE 5

$\alpha$-Diethylaminomethyl-$\alpha',\alpha'$-diphenyl-o-xylene-$\alpha,\alpha'$-diol To diethylaminophthalidylmethane (15.0 g., 0.068 mole) in ether (500 ml.) is added phenyl-lithium (4 molar ratio) in benzene/ether. After refluxing for 1 hour the reaction mixture is worked up to yield 17 g. (66%) of crystalline material, M.P. 145°–146° C.

Analysis.—Calculated for $C_{25}H_{29}NO_2$: C, 79.96%; H, 7.78%; N, 3.73%. Found: C, 79.58%; H, 7.79%; N, 4.02%.

EXAMPLE 6

$\alpha$-(1-dimethylaminopropyl)-$\alpha',\alpha'$-diphenyl-o-xylene-$\alpha,\alpha'$-diol To a solution of 1-dimethylamino-1-phthalidylpropane (6.0 g., 0.0274 mole) in ether (50 ml.) is slowly added with stirring a solution of phenylmagnesium bromide (18.3 ml., 0.0548 mole) in ether (50 ml.). A yellow solid forms upon the addition. Additional ether (50 ml.) is added and the mixture is stirred under reflux. At the end of the reaction the mixture forms a hard mass which is broken up by the addition of a solution of ammonium chloride (15.0 g.) in water (500 ml.). A small ether layer is separated and the aqueous solution is extracted twice with ether, the ether extracts being combined with the separated ether layer. The combined ether solutions are washed with distilled water, dried over anhydrous magnesium sulfate and evaporated to yield an oil which on spectral analysis shows the presence of a by-product containing a carbonyl function.

The oil (about 6.5 g.) is taken up in tetrahydrofuran (50 ml.) and the solution slowly added with stirring to a solution of lithium aluminum hydride (1.5 g.) in tetrahydrofuran (100 ml.). The mixture is refluxed for two hours with stirring and then cooled in an ice bath. Water (1.65 ml.), then 20% sodium hydroxide (1.2 ml.) and finally water (6 ml.) are added to decompose residual hydride. The mixture is filtered through diatomaceous earth, the filter cake washed with tetrahydrofuran and the filtrate taken to dryness to give a clear resin (about 6.5 g.). The product is obtained by crystallization and recrystallization from methanol in a yield of 1.4 g. (14%), M.P. 167° C.–168° C.

Analysis.—Calculated for $C_{25}H_{29}NO_2$: C, 79.96%; H, 7.79; N, 3.73%; O, 8.52%. Found: C, 79.77%; H, 7.77%; N, 4.02%; O, 8.36%.

EXAMPLE 7

α-(1-diethylaminopropyl)-α',α'-diphenyl-o-xylene-α,α'-diol

In the same manner as described in Example 5, 1-diethylamino-1-phthalidylpropane (8.0 g., 0.032 mole) is treated with phenyl-lithium to yield 9.3 g. of the product in the form of its oxalate salt, M.P. 167°–170° C.

*Analysis.*—Calculated for $C_{27}H_{33}NO_2 \cdot C_2H_2O_4$: C, 70.56%; N, 2.83%. Found: C, 70.32%; N, 2.92%.

EXAMPLE 8

α-Dimethylaminomethyl-α',α'-di-(2-methylphenyl)-o-xylene-α,α'-diol o-Bromotoluene (119 g.) is heated in ether with a lithium (9.8 g.) dispersion to form o-tolyl lithium. To the resulting solution is then added dimethylaminophthalidylmethane (19.5 g., 0.1 mole) in ether. After heating for 1 hour the reaction is broken up by the addition of water (200 ml.). Extraction with ether and evaporation to an oil gives a product which is recrystallized from acetonitrile in a yield of 13 g. (29%), M.P. 141°–143° C.

*Analysis.*—Calculated for $C_{25}H_{29}NO_2$: C, 79.96%; H, 7.79%; N, 3.73%. Found: C, 79.58%; H, 7.69%; N, 3.94%.

EXAMPLE 9

α-Dimethylaminomethyl-α',α'-di-(4-methylphenyl)-o-xylene-α,α'-diol

A solution of p-tolyl-lithium is prepared by transmetallation of p-bromo-toluene (27.4 g., 0.17 mole) in ether (25 ml.) with 1.6 N n-butyl-lithium (93 ml.) in hexane. After the reaction is completed, most of the hexane is removed and additional ether is added (to a volume of 100 ml.). To this solution is then added an ether solution (100 ml.) of dimethylaminophthalidylmethane (0.05 mole). After refluxing for 30 minutes the reaction mixture is worked up by the addition of water and recrystallization of the extracted solid, 8.7 g. (46%), M.P. 154°–155.5° C.

*Analysis.*—Calculated for $C_{25}H_{29}NO_2$: C, 79.96%; H, 7.78%; N, 3.73%. Found: C, 79.60%; H, 7.81%; N, 3.91%.

EXAMPLE 10

α-Dimethylaminomethyl-α',α'-di-(2-methoxyphenyl)-o-xylene-α,α'-diol

To a solution of 2-methoxyphenyl lithium (62.0 g., 0.33 mole) in ether is added dimethylaminophthalidylmethane (15 g., 0.075 mole) in ether (100 ml.). The mixture is refluxed for 4 hours and is worked up by the addition of water and extraction with ether. Recrystallization from isopropyl alcohol yields 17 g. (55%) of product, M.P. 136°–138° C.

*Analysis.*—Calculated for $C_{25}H_{29}NO_4$: C, 73.68%; H, 7.17%; N, 3.44%. Found: C, 73.55%; H, 7.06%; N, 3.30%.

EXAMPLE 11

α-Dimethylaminomethyl-α',α'-di(4-chlorophenyl)-o-xylene-α,α'-diol

To a solution of p-chlorobromobenzene (105.0 g., 0.55 mole) in petroleum ether (300 ml., B.P. 30°–60° C.) is added 1.6 N n-butyl-lithium (315 ml.). The reaction mixture is refluxed for 4 hours to yield p-cholorphenyl lithium. To the solution is then added dimethylaminophthalidylmethane (19.7 g.) in the smallest amount of ether (30 ml.) required to effect easy handling. The reaction mixture is then stirred under reflux for an additional hour. The product (30 g., 60%) is obtained in the form of its oxalate salt and is recrystallized to yield a pure product, M.P. 155°–158° C.

*Analysis.*—Calculated for $C_{23}H_{23}NO_2Cl_2 \cdot C_2H_2O_4 \cdot H_2O$: C, 57.25%; H, 5.19%; Cl, 13.52%. Found: C, 57.59%; H, 5.45%; Cl, 14.01%.

EXAMPLE 12

α-Dimethylaminomethyl-α',α'-di-(4-fluorophenyl)-o-xylene-α,α'-diol

By the same procedure described in Example 11, dimethylaminophthalidylmethane (19.7 g., 0.1 mole) is treated with p-fluorophenyl lithium (obtained by the refluxing in petroleum ether (30°–60° C.) of p-bromofluorobenzene and n-butyl-lithium). The product is recrystallized and isolated in the form of its oxalate salt, M.P. 147°–150° C.

*Analysis.*—Calculated for $C_{23}H_{23}NO_2F_2-C_2H_2O_5$: C, 63.41%; H, 5.32%. Found: C, 63.02%; H, 5.22%.

EXAMPLE 13

α-Dimethylaminomethyl-α',α'-di-(2-thienyl)-o-xylene-α,α'-diol

α-Lithiothiophene is prepared from thiophene (75.6 g.) in ether as described in J. Am. Chem. Soc. 71: 1871 (1949). To the resulting solution is added dimethylaminophthalidylmethane (19.7 g., 0.1 mole) in ether. After stirring for 16 hours at room temperature the reaction mixture is worked up to give 25 g. of a dark colored solid which upon Norite treatment in methanol yields 21 g. (58%) of light-colored crystalline product, M.P. 142°–144° C.

*Analysis.*—Calculated for $C_{19}H_{21}NO_2S_2$: C, 63.47%; H, 5.88%; N, 3.89%; S. 17.83%. Found: C, 63.06%; H, 5.89%; N, 4.17%; S, 18.11%.

EXAMPLE 14

α-(1-dimethylaminopropyl)-α',α'-di-(2-thienyl)-o-xylene-α,α'-diol

By the same procedure described in Example 13, 1-dimethylamino-1-phthalidylpropane (10.3 g., 0.047 mole) is treated with α-thienyl-lithium to yield 13.7 g. (75%) of product, M.P. 113°–115° C.

*Analysis.*—Calculated for $C_{21}H_{25}NO_2S_2$: C, 65.07%; H, 6.50%; N, 3.61%; S, 16.54%. Found: C, 65.01%; H, 6.43%; N, 3.70%; S, 16.39%.

EXAMPLE 15

α-(1-aminopropyl)-α',α'-diphenyl-o-xylene-α,α'-diol 1-phthalidylpropylamine (2.0 g., 0.09 mole) in tetrahydrofuran is added to phenyl-lithium (19.9%, 25 ml., 0.54 mole) in tetrahydrofuran at room temperature. The mixture is then refluxed for 20 minutes. Workup yields 1.5 g. (50%) of product as an oil.

EXAMPLE 16

α-(1-dimethylaminomethyl)-α',α'-di-(m-trifluoromethylphenyl)-o-xylene-α,α'-diol m-Trifluoromethylphenyl lithium is prepared from m-bromotrifluoromethylbenzene (79 g., 0.35 mole) and 1.6 N n-butyl-lithium (206 ml.) by refluxing them together for one hour. To the mixture is then added dimethylaminophthalidylmethane (19 g., 0.1 mole) in ether. After stirring for 30 minutes at room temperature the reaction mixture is worked up by the addition of saturated ammonium chloride solution, extraction with ether and evaporation to yield the product as an oil.

The subject matter which the applicant regards as his invention is particularly pointed out and distinctly claimed as follows.

What is claimed is:
1. α-(Di-lower alkylamino-lower alkyl)-o-xylene-α,α'-diol.
2. α-Dimethylaminomethyl-o-xylene-α,α'-diol.
3. α-(1-dimethylaminopropyl)-o-xylene-α,α'-diol.
4. α - Dimethylaminomethyl - α',α'-di-n-butyl-o-xylene-α,α'-diol.
5. α - Dimethylaminomethyl - α',α'-diphenyl-o-xylene-α,α'-diol.

6. α - Diethylaminomethyl - α',α' - diphenyl-o-xylene-α,α'-diol.

7. α - (1-dimethylaminopropyl)-α',α'-diphenyl-o-xylene α,α'-diol.

8. α - (1-diethylaminopropyl)-α',α'-diphenyl-o-xylene-α,α'-diol.

9. α - Dimethylaminomethyl-α',α'-di-(2-methylphenyl)-o-xylene-α,α'-diol.

10. α - Dimethylaminomethyl - α',α' - di - (4 - methylphenyl)-o-xylene-α,α'-diol.

11. α - Dimethylaminomethyl - α',α' - di - (2 - methoxyphenyl)-o-xylene-α,α'-diol.

12. α - Dimethylaminomethyl - α',α' - di - (4 - chlorophenyl)-o-xylene-α,α'-diol.

13. α - Dimethylaminomethyl - α',α' - di - (4 - fluorophenyl)-o-xylene-α,α'-diol.

14. α - Dimethylaminomethyl - α',α' - di - (2 - thienyl)-o-xylene-α,α'-diol.

15. α - (1 - dimethylaminopropyl) - α',α' - di - (2 - thienyl)-o-xylene-α,α'-diol.

16. α - (1 - aminopropyl)-α',α'-diphenyl-o-xylene-α,α'-diol.

17. α - Dimethylaminomethyl - α',α' - di - (m - trifluoromethylphenyl)-o-xylene-α,α'-diol.

No references cited.

WALTER A. MODANCE, *Primary Examiner.*

JAMES A. PATTEN, *Assistant Examiner.*